June 26, 1951

C. J. MALHIOT ET AL 2,558,368

CONVEYING AND TRANSFERRING MECHANISM

Filed April 30, 1948

Inventors:
Clarence J Malhiot
Elmer Sramek
By: Spencer, Marzall, Johnston & Cook,
attys

Fig. 2, Fig. 3, Fig. 4

Inventors
Clarence J. Malhiot
Elmer Sramek
By: Spencer, Marzall, Johnston & Cook
attys

June 26, 1951     C. J. MALHIOT ET AL     2,558,368
CONVEYING AND TRANSFERRING MECHANISM
Filed April 30, 1948     5 Sheets-Sheet 4

Inventors:
Clarence J. Malhiot
Elmer Sramek
By: Spencer, Marzall, Johnston & Cook
attys Patented June 26, 1951

2,558,368

UNITED STATES PATENT OFFICE 2,558,368

CONVEYING AND TRANSFERRING MECHANISM

Clarence J. Malhiot, Oak Park, and Elmer Sramek, Cicero, Ill., assignors to F. B. Redington Co., Chicago, Ill., a corporation of Illinois Application April 30, 1948, Serial No. 24,166

13 Claims. (Cl. 93—2)

This invention relates to conveying and transferring mechanism in general, and, particularly, to wrapping machines having mechanism for conveying and transferring articles to be wrapped. More specifically, the invention relates to applying a wrapper on a conveyor which transfers an article from one position to another so that an article may be arranged in proper position with respect to a wrapper which is properly arranged on the conveying mechanism to be transferred to different locations for effecting the wrapping operation.

It is well known to apply a wrapper on a movable conveyor or part thereof so that articles may be wrapped continuously during the conveying and transferring operation. However, it has not been completely successful because ordinarily the wrapper is dropped in a predetermined position with respect to the conveyor causing the wrapper to be shifted or to become displaced so that when the wrapper is wrapped about the article, the wrapper will not be square and even and therefore presents a less desirable appearance.

The primary object of the present invention is to overcome the inherent disadvantages of placing wrappers periodically in spaced relationship on a continuously moving belt or conveyor, whereby the wrapper is properly positioned and then held in the proper position at all times throughout its movement until the article is placed thereupon for being wrapped.

Another important object of the invention consists in the provision of new and improved transferring mechanism comprising a plurality of hingedly connected buckets connected together to form an endless chain and providing an endless conveyor, there being means provided for placing a wrapper within each bucket so that the wrapper will be properly positioned with respect to each bucket and then held in position for a predetermined length of time and during the continuous operation of the conveyor to properly line successive buckets, each with a wrapper, and then hold the wrapper in its proper position for a predetermined length of time until an article has been placed thereon.

A further object of the invention consists in the provision of new and novel mechanism embodying mechanism for placing a wrapper into successive buckets as they are moving continuously, and then holding the wrapper in position by holding fingers for holding the wrapper at predetermined positions and for a predetermined time interval until an article is placed on the wrapper to have the wrapper formed thereabouts.

A still further object of the invention consists in the provision of mechanism for positioning and holding wrappers against the buckets of a continuously moving conveyor, there being mechanism to control the operation of the fingers, said mechanism and fingers traveling in an orbital path along with the movement of the conveyor and at substantially the same speed thereof so that the wrapper will be in proper position and maintained in such position until an article to be wrapped is placed thereupon.

Still another object of the invention consists in the provision of new and novel mechanism constructed in a predetermined manner and adapted to have correlated movement with respect to the movement of a conveyor for causing a hollow bucket-shaped continuously moving element to be lined with the wrapper; also, the specific means, arrangement and construction of the elements for performing the operation of lining the bucket with a wrapper and maintaining the wrapper in proper position for a predetermined interval of time until an article to be wrapped is positioned on top of the wrapper within the bucket.

Numerous other objects and advantages will be apparent throughout the progress of the specification which follows.

The accompanying drawings illustrates a selected embodiment of the invention, and the views therein are as follows.

The particular construction herein shown for the purpose of illustrating the invention comprises a suitable frame or supporting structure which may be part of a wrapping machine, or it may comprise a separate unit adapted to be incorporated with certain operable parts of a wrapping machine, and synchronized and correlated therewith to perform a complete wrapping operation.

The present machine unit of this invention has an upper rod or bar 1, and a lower rod or bar 2, which are adapted to be secured to rigid parts of the frame or structure. The upper rod or bar 1, is preferably round and the lower rod or bar 2, is preferably square. A right hand carrier slide, or slide carriage 3, is adapted to be mounted on the rods or bars 1 and 2, for slidable horizontal and longitudinal movement thereon. The slide carriage 3 preferably is made in the form of a solid integral unit having a circular hole therein to receive the round rod or bar 1, Figs. 1 to 4.

The slide carriage 3, also comprises an extension in the form of an elongated boss through which the round rod or bar 1, passes. The lower end of the slide carriage 3 may be rabbeted out to provide a relatively square opening to receive the square rod or bar 2, whereby the slide carriage is supported on, and guided by, the rods or bars 1 and 2. A right hand paper support which comprises a plurality of inwardly extending spaced apart fingers 4, is secured to a strap or bar 5 which is connected rigidly to the upper end of the slide carriage 3, Figs. 1 to 4.

Figure 1:
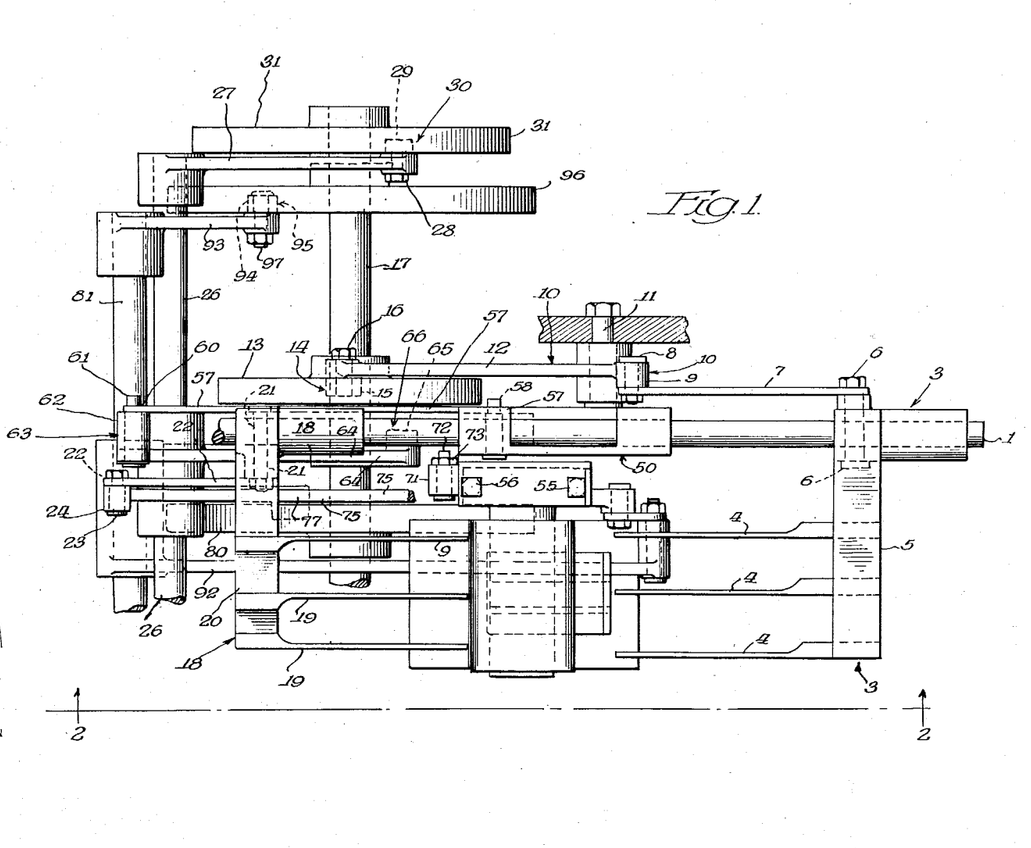
Fig. 1 is a detail plan view of conveying and transferring mechanism adapted to be used in a wrapping machine, said mechanism embodying the invention.

A stud 6, Fig. 1, is mounted operatively in the slide carriage 3 and pivotally supports one end of a link 7. The other end of the link 7 is connected pivotally by a stud 8 to an arm 9 of a bell crank 10, Figs. 1 to 3. The bell crank 10 is pivotally mounted on a pivot stud 11 which is secured to a rigid part of the frame, and has its other arm 12 driven by a cam 13, Fig. 2.

Figure 2:
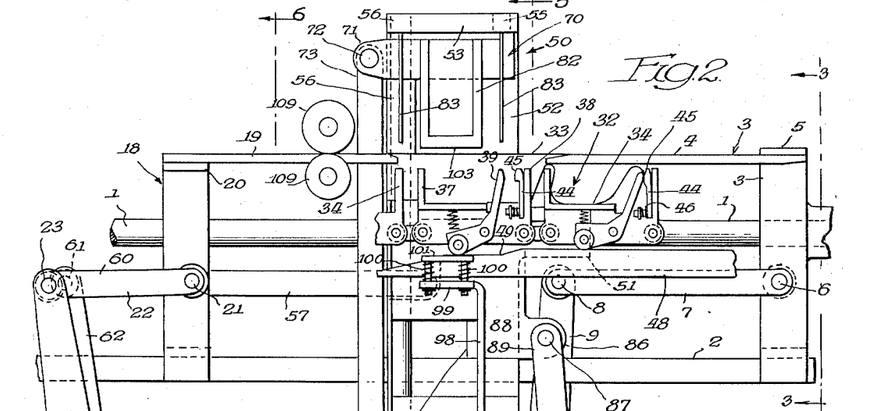
Fig. 2 is a detail elevational view looking in the direction of the arrows 2—2 of Fig. 1, parts being broken away for the sake of clearness.
Figures 3, 4:
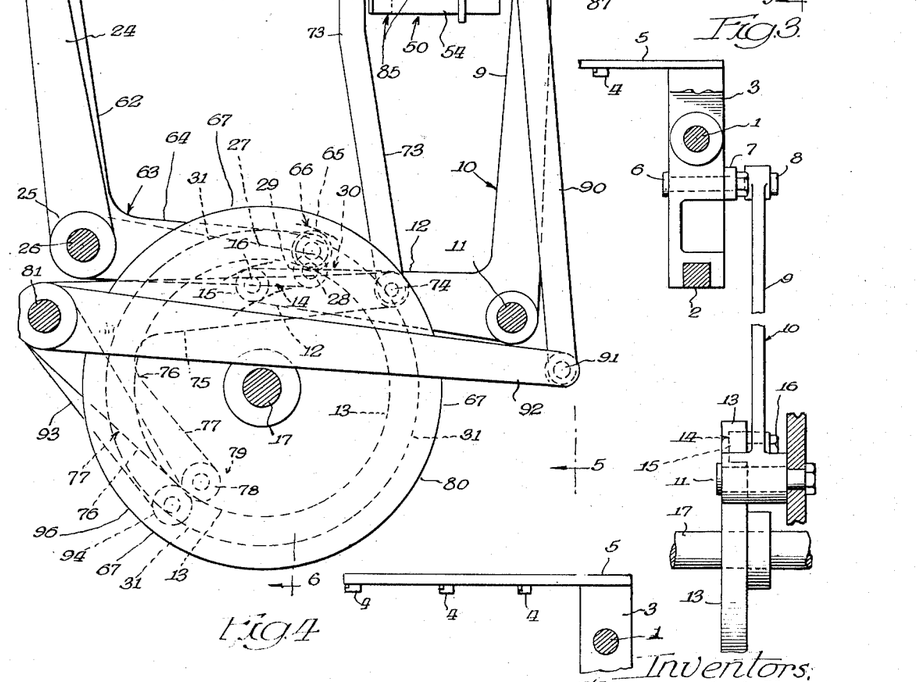
Fig. 3 is a detail transverse sectional view looking in the direction of the arrows 3—3 of Fig. 2.
Fig. 4 is a detail elevational view of part of the structure shown in Fig. 3.

A cam 13, Figs. 2 and 3, has a cam groove 14 which receives a cam roller 15 mounted on the end of the cam lever arm 12 of the bell crank 10, the cam roller 15 is secured to the arm 12 by means of a stud 16. The cam 13 is mounted upon and secured to a transverse main drive shaft 17 which is suitably and properly mounted in bearings carried by the main frame of the machine. The right hand slide carriage 3 is therefore adapted to have back and forth horizontal reciprocating or slidable motion on the rods or bars 1 and 2.

Figures 5, 6:
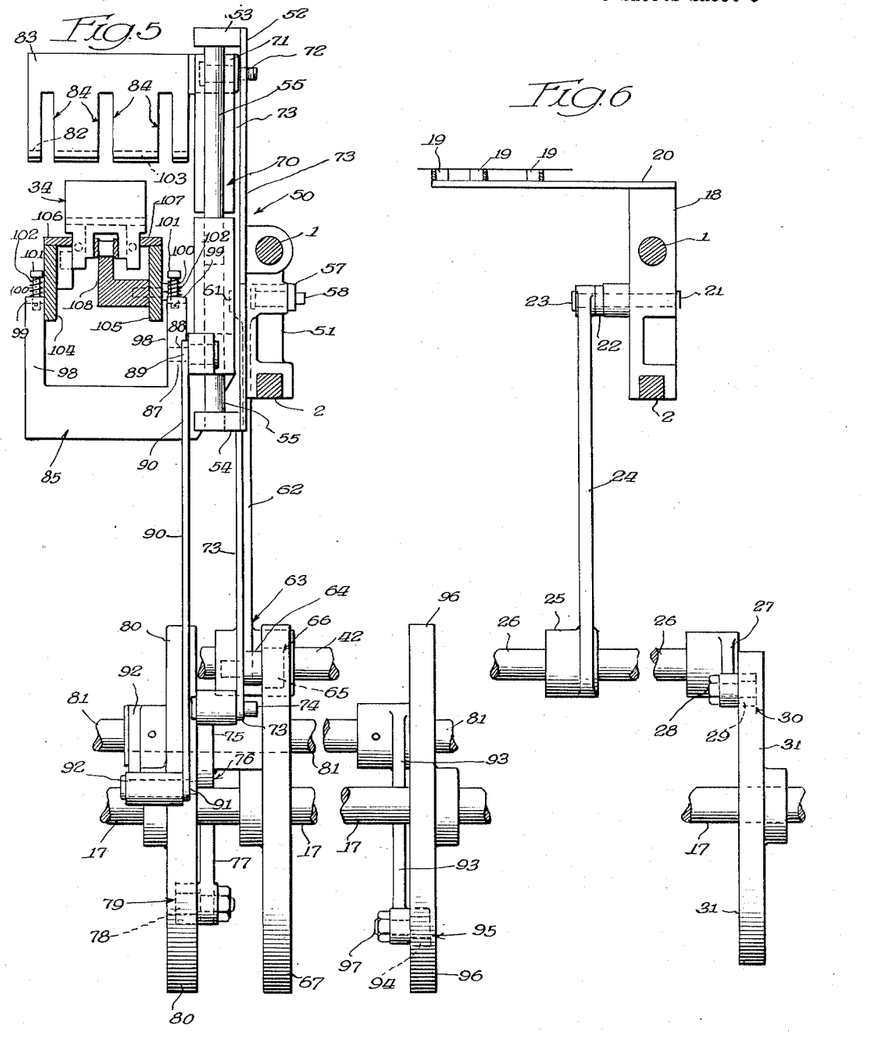
Fig. 5 is a detail transverse sectional view on the line 5—5 of Fig. 2.
Fig. 6 is a detail transverse sectional view on the line 6—6 of Fig. 2.

A left hand carriage slide, or slide carriage 18, Figs. 1, 2 and 6, which is substantially a duplicate of the slide carriage 3, is mounted on the same rods or bars 1 and 2, in the same manner as the slide carriage 3. This left hand slide carriage 18 includes a plurality of spaced apart inwardly extending fingers 19 which are secured to the cross bar 20 on the upper side of slide carriage 18. A stud 21 projects from the slide carriage 18 and pivotally supports one end of a link 22. The other end of the link 22 is pivotally mounted on the stud 23 to which a lever arm 24 is pivotally connected. The lower end 25 of the lever 24 is fixed to a pivot shaft 26 which is pivotally mounted in a part of the frame. A second lever arm 27, Fig. 6, is fixed to the pivot shaft 26 and carries a stud 28 upon which a cam roller 29 is mounted. The cam roller 29, Figs. 2 and 6, operates in the cam groove 30 of a cam 31. The cam 31 is mounted on the same shaft 17 upon which the cam 13 is mounted. The left hand slide carriage 18 is given back and forth horizontal reciprocal slidable movement on the rods or bars 1 and 2, in the same manner as the right hand slide carriage 3.

The construction of the cams 13 and 31, including their respective grooves 14 and 30, is such that the right and left hand slide carriages 3 and 18, respectively, will be caused to operate in unison toward and away from each other and at the same rate of speed. The slide carriages 3 and 18 travel at a rate of speed equal to that of a movable endless conveyor 32 with which they cooperate so that sheets or wrappers will move along a predetermined path and receive articles to be wrapped and then wrapped about the articles.

*Conveyor 32*

The endless conveyor 32, Figs. 2 and 7 to 10, comprises a plurality of spaced buckets 34 each of which is pivotally connected at its adjacent ends by means of sprocket chain links 35. Each bucket 34, Figs. 7 to 12, comprises a rigid base 36 having an upwardly extending rigid integral front wall 37 and an upwardly extending rigid rear wall 38. An intermediate shiftable wall 39 is arranged between the walls 37 and 38. The shiftable wall 39 comprises an upstanding rigid element 40 terminating in downwardly extending opposed legs 41 which straddle the rigid body part or base 36 of each bucket 34. The shiftable wall 39 is pivotally mounted at 42 to a part of the bucket base 36 by means of a pin extending through aligned holes in the legs 41 and the base 36. Spring means 43 engage an upper surface of the legs 41, and normally urge the shiftable member 39 in a normally vertical position. Abutments or shoulders may be provided on the shiftable wall 39, and normally engage cooperating abutments or shoulders on a part of the bucket to limit the inward shiftable movement of the shiftable wall 39.

The rear walls 38 have spring pressed vertically extending transverse plates 44 which are provided with inwardly projecting centrally positioned buttons or knobs 45 near its upper end to engage and secure a sheet or wrapper 33 against the rear of the shiftable wall 39.

The transverse plate has spaced openings at or near its base through which pins 46 extend. The pins 46 project outwardly from the rear wall 38 and extend toward the shiftable wall 39. A spring surrounds each pin 46 and tends to urge the plate 44 toward the rear wall 38. The plate 44 has slidable movement against the urging action of the springs around the pins 46. The plate 44 also may have pivotal movement in a vertical arc by making the holes in the plate larger than the diameter of the pins.

Each leg 41 of the shiftable wall 39 may be provided with a roller 47 which is adapted to cooperate with a cam bar 48 to control the position of the shiftable wall 39, and to shift the wall 39 about the pivot points 42.

The roller 47 normally extends below the upper surface of a cam bar located on each side of the buckets and secured to the machine frame. Each cam bar 48 has an inclined cam surface 49 which is engaged by the rollers during movement of the conveyor. The movable buckets bring the rollers 47 in the path of the cam surface 49 and shift the shiftable wall 39 of each successive bucket toward the plate 44 (to the right, Figs. 7 to 12). The rollers 47 thus ride up the cam surface 49 to shift the wall 39, the wall 39 being held in its shifted position as long as the rollers 47 ride on the upper surface of the cam bar 48. The shiftable walls 39 are returned to normal position by the springs 43 as soon as the rollers 47 leave the cam bars 48. The shiftable movement of the wall 39 is desirable as it assists in positioning and holding the wrappers or sheets 33 as well as permitting articles (not shown) to be placed in the buckets and on the wrappers to be later wrapped. The wrappers 33 are adapted to be placed successively in moving buckets and held in the moving buckets for a predetermined length of time by means of vertically operated slide mechanism 50.

*Slide mechanism 50*

The slide mechanism 50, Figs. 1, 2 and 5, is provided for positioning the sheets or wrappers 33, in which articles are to be wrapped and for clamping or otherwise holding the wrapper in a predetermined position for a predetermined length of time until an article to be wrapped is placed thereupon. This slide mechanism 50 comprises a driver 51 which is mounted slidably for horizontal reciprocation on the upper and lower rods 1 and 2, respectively, Figs. 1, 2 and 5.

The slide mechanism 50 travels forward at the same speed as a traveling bucket and then returns rearwardly to cooperate with the next succeeding adjacent bucket. This slide mechanism includes a vertically disposed plate-like frame 52 which is secured rigidly to the driver horizontal 51. A top cap 53 is secured rigidly to the plate 52 at the upper end thereof, and a bottom cap 54 is secured rigidly to the plate 52 at the lower end thereof. Vertical rods 55 and 56 are spaced horizontally and have their upper and lower ends secured rigidly to the top and bottom caps 53 and 54, respectively. These rods move along with the driver 51 during its horizontal reciprocatory movement along the rods 1 and 2.

The driver 51 is driven by means of a link 57 which has one of its ends pivotally connected to a stud 58 on the driver 51, Figs. 1, 2 and 5. The other end 60 of the link 57 is pivotally connected to a stud 61. The stud also is connected pivotally to one arm 62 of a bell crank 63. The other arm 64 of the bell crank 63 carries a roller 65 which operates in a cam groove 66 of the cam 67. The cam 67 is fixed to the main shaft 17 and is rotated thereby. The rotation of the main shaft 17 therefore rotates the cam 67, and through the mechanism 57—67 causes horizontal reciprocation of the driver 51. The cam 67 and its cam groove 66 is such that the driver 51, and consequently the slide mechanism 50 which it drives, will be reciprocated longitudinally in a horizontal plane at a speed synchronized and correlated with the right hand slide carriage 3 and the left hand slide carriage 18. The driver 51 therefore moves the slide mechanism 50 at the same speed as the moving buckets 34.

*Upper slide head 70 of slide mechanism 50*

The slide mechanism 50, Figs. 1, 2 and 5, includes an upper slide member or slide head 70 which is mounted for vertical slidable movement on the vertical rods 55 and 56 and is guided on said rods. The upper slide head 70 is provided with a groove on its right side, Fig. 1, to receive the rod 55. The left hand side of the upper slide head is relatively tubular and has a circular opening to receive the round rod 56, Fig. 1.

The upper slide head 70, Figs. 1, 2 and 5, is adapted to be reciprocated vertically on the rods 55 and 56. An ear 71 is formed integrally with the slide head and extends outwardly therefrom a predetermined distance (to the left, Fig. 2). The ear 71 carries a stud 72 to which one end of the link or plunger rod 73 is connected. The other end of the link or plunger rod 73 is connected to a pivot stud 74. This pivot stud 74 pivotally connects the link or plunger rod 73 to one arm 75 of the bell crank 76, Figs. 2 and 5. The other arm 77 of the bell crank 76 carries a cam roller 78 which operates in a cam way or cam groove 79 of a cam 80. The cam 80 is positioned in front of the cam 67 and is fixed to, and driven by, the main drive shaft 17, Fig. 5. The bell crank 76 is pivotally mounted on a transverse shaft 81, Figs. 2 and 5. A rotation of the cam 80, therefore, rocks the bell crank 76 on its pivot 81 and causes vertical or up-and-down movement of the arm 75 of the bell crank 76. This up-and-down movement of the crank arm 75 causes vertical movement of the link or plunger rod 73, and inasmuch as the rod or link 73 is connected pivotally at 72, to ear 71 of the upper slide head 70, the upper slide head 70 will be given vertical slidable movement along the vertical space rods 55 and 56.

The upper slide head 70 carries a plunger 82 and a pair of plunger blades 83, there being a blade 83 arranged on each side of the plunger 82 as shown clearly in Fig. 2. The plunger blades 83 are provided with cut-outs or slots 84, Fig. 5, so that the plunger is free to pass beyond the paper support fingers 4 and 19.

The plunger 82 and plunger blades 83 are for the purpose of engaging a sheet or wrapper 33 and positioning and assisting in holding the wrapper in position until an article is placed on the wrapper to be wrapped thereby.

*Lower slide head 85 of slide mechanism 50*

The slide mechanism 50, Figs. 1, 2 and 5, also includes a lower slide head 85 which is substantially like the upper slide head 70, but inverted, the circular opening being on the right side and the square opening being on the left side, whereby the rod 55 will engage the circular opening in the lower slide head while the rod 56 will engage the groove formed on the left hand side.

An ear 86 is formed on the right side of the lower slide head 85, the ear 86 being the same as the ear 71, except the ear 86 is on the right hand side of the lower slide head while the ear 71 is on the left hand side of the upper slide head.

The lower slide head 85 carries a stud 87 to which there is pivoted at 88, the upper end 89 of a link or lower plunger rod 90. The lower end of the link or rod 90 is pivotally connected at 91 to a lever arm 92. This lever arm 92 is clamped, or otherwise fixed, to the transverse shaft 81.

A second lever arm 93 is also clamped, or otherwise fixed, to the transverse shaft 81. This lever arm 93 carries a cam roller 94 at its lower end which engages a cam groove 95 formed in a face of a cam 96, the cam 96 being fixed to the main drive shaft 17 and is rotated thereby. A stud 97 secures the cam roller 94 to the lower end of the cam lever 93, Fig. 5. The cam 96, therefore, causes rocking action of the shaft 81, which in turn causes rocking movement of the lever arm 92. The rocking action of the lever arm 92 causes vertical reciprocation of the lower slide head 85. The vertical movement of the lower slide head 85 is correlated and synchronated with the vertical movement of the upper slide head 70. The movement of the two slide heads 70 and 85 is such that the upper slide head will move downwardly while the lower slide head will move upwardly.

The lower slide head 85, Figs. 1, 2 and 5, includes upwardly extending arms 98, with turned over flanges 99. Pins 100 pass loosely through the flanges 99 and carry a cross member or narrow plate to form a clamping face 101, springs 102 encircling the pins 100 to urge the clamping face 101 in an upward position but permitting the clamping face to yield. The clamping face 101 cooperates with the bottom face 103 of the plunger 82 to secure and clamp a wrapper 33 ththerebetween. The lower face 103 may have friction material, such as rubber thereon, if desired.

The arrangement and construction of the slide mechanism 50 is such that the two slide heads 70 and 85 will cooperate to engage, arrange and hold a sheet or wrapper 33 in a predetermined position with respect to the buckets 34 of the horizontal moveable conveyor 32, as the buckets move successively into position. The slide heads 70 and 85 move toward and away from each other, and they both reciprocate back and forth in proper sequence with respect to the slide carriages 3 and 18. The slide carriages support and guide the wrappers 33 while the slide heads 70 and 85 position and hold the wrappers in position on the buckets 34.

*Conveyor drive*

The endless conveyor 32 comprises the adjacently spaced and positioned buckets 34 which are pivotally connected at their adjacent ends by means of the chain sprocket links 35, Fig. 5. The conveyor 32, comprising the hingedly connected buckets 34, is mounted between bucket rails 104 and 105. The conveyor 32 is guided in a proper path of movement by means of turned guide fingers 106 and 107 which extend into the guide ways or recesses of the buckets 34. These bucket guide rails 104 and 105 are secured to a rigid part of the machine and guide the buckets throughout their endless path of movement. A conveyor support 108 is secured to one of the bucket rails (to the rail 105, Fig. 5) or to a rigid part of the machine, and support the buckets 34 throughout their movement and prevents sagging of the conveyor 32.

A driven sprocket (not shown) is arranged at one end of the machine and has teeth which engage the successive connecting chain links 35. The idler sprocket is arranged at the opposite end of the machine and has teeth which engage the links 35 to drive the conveyor 32 continuously. The driven sprocket may be driven in any suitable manner, such as from the main drive shaft 17. The method of driving the several buckets 34 may be done in any convenient manner and inasmuch as the driving means is not claimed in this application, no specific mechanism therefor is described. However, drive mechanism of the type disclosed in the co-pending application, Clarence J. Malhiot, Serial No. 10,962, filed February 26, 1948, may be employed for driving the present conveyor 32.

The buckets 34 are driven continuously at a predetermined speed, and individual wrappers 33 are arranged in the individual buckets 34 as the buckets 34 are moving. The slide mechanism 50 holds the wrappers 33 in a predetermined position until articles to be wrapped are placed on the wrappers which are suitably arranged or lined in the buckets.

The sheets or wrappers 33 may be cut from a continuous roll of paper or other wrapping material, or the wrappers may be pre-cut. The wrappers 33 are fed in position with respect to the slide carriages 3 and 18 by feed rollers 109, Fig. 2, which are arranged in proper position with respect to the buckets 34 and with respect to the slide mechanism 50. The movement of the wrappers with respect to the slide mechanism 50 and the slide carriages 3 and 18 are shown diagrammatically or schematically in Figs. 7 to 12 inclusive.

The slide carriages 3 and 18 are properly synchronated and correlated with respect to other operating parts so that they will operate in proper time with respect to the movement of the buckets, and position a sheet of material, such as a wrapper, on the individual buckets successively. The slide mechanism 50 is also correlated with respect to the slide carriages 3 and 18 so that the slide mechanism 50 will be moved horizontally at the same speed as the moving buckets 34, and then return to original position in time to cooperate with the next succeeding bucket. Also, the slide heads 70 and 85 are properly synchronized and correlated with respect to the other mechanism so that the upper slide head will position properly the wrapper 33 in the moving bucket 34; and while the wrapper 33 is being positioned with respect to the bucket, the lower slide head will operate so that the wrapper 33 will be impinged or clamped between the bottom face 103 of the plunger 82 of the upper slide head 70 and the top of the clamping faces 101 of the slide head 85.

The normal or inoperative position of the slide mechanism 50 is disclosed in Fig. 2 wherein the upper and lower slide heads are spaced apart, and the slide carriages 3 and 18 are at the outward end of their respective movements, a wrapper having been fed by the left hand slide carriage 18 from the rolls 109 being supported by the fingers 19. The slide carriages 18 and 3 move together so as to support the ends of the wrapper 33. The slide carriages 3 and 18 move inwardly so that the wrapper will lie between the lower end 103 of the plunger 82 and the upper clamping face 101 of the lower slide head 85 at the time a bucket 34 is in a proper predetermined position with respect to the slide mechanism 50.

Figure 7:
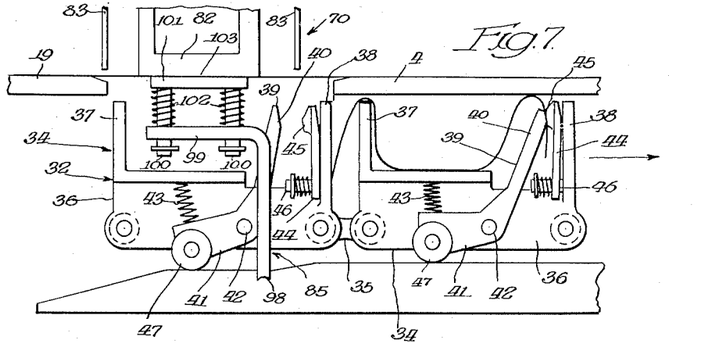
Figs. 7 to 12, inclusive, are diagrammatic or schematic views showing the various progressive stages in which the buckets are lined with the wrappers.
Figure 8:
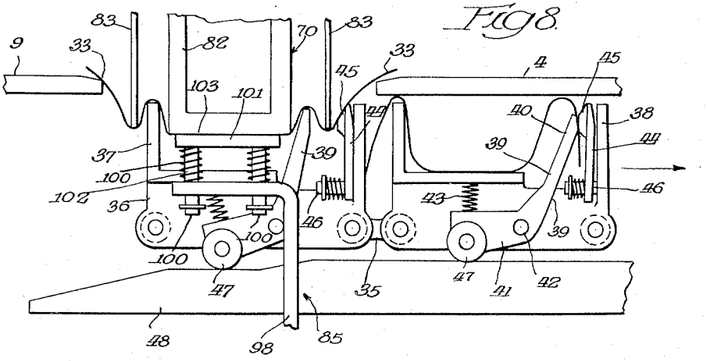
Figure 9:
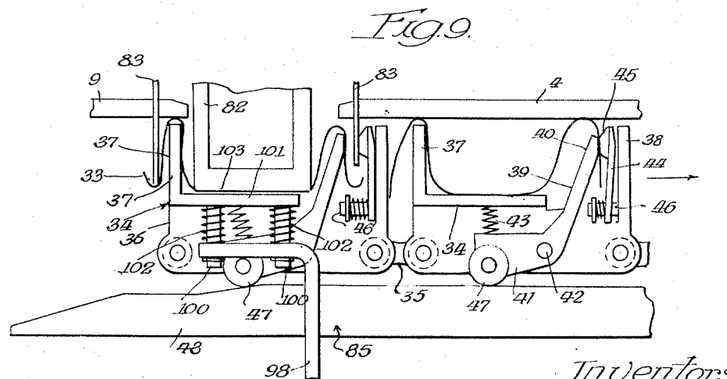

After the fingers 19 and 4 are at the fullest extent of their outward travel, with a wrapper 33 arranged thereacross, the parts will be in position, as shown in Fig. 7, at which time the upper and lower slide heads 70 and 85 respectively will have moved together, and clamp the wrapper 33 therebetween, as shown in Fig. 7. The movement of the wrapper 33 to the right is maintained by the slide mechanism 50 which also moves to the right along with the bucket, Figs. 7 to 12.

The plunger 82 of the upper slide head 70, continues its downward movement and engages the top 101 of the lower slide head 85, and maintains the wrapper 33 in clamped position between the plunger face 103 and the face 101 of the lower slide head 85, depressing the top plate 101 because of its resilient engagement with the upper surface of the plunger.

The plunger blades 83, are positioned outwardly on the plunger 82 and engage the wrapper 33 forcing it over the upstanding end of the buckets 34.

*Operation*

Figure 10:
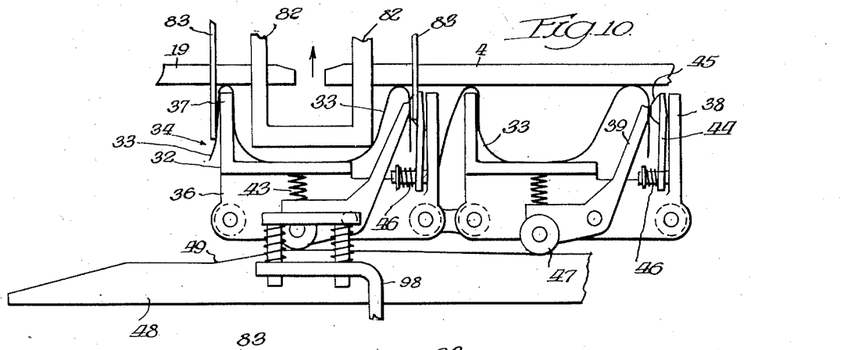
Figure 11:
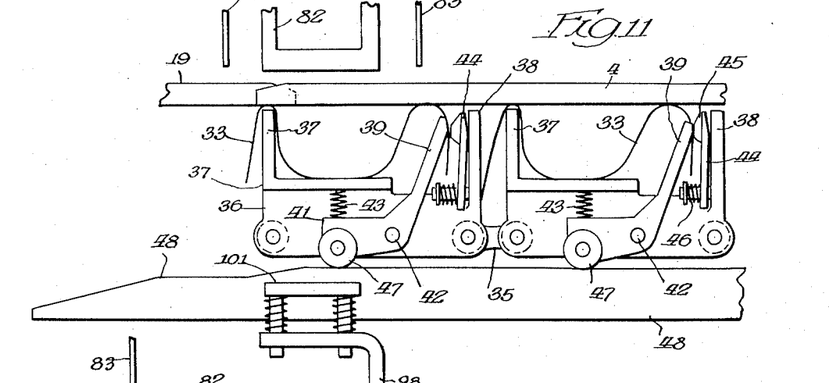
Figure 12:
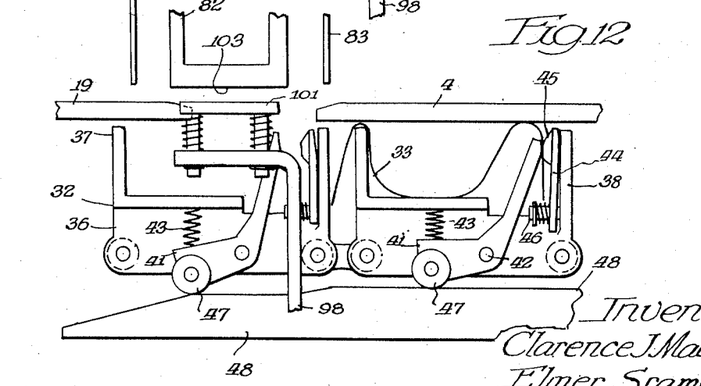

Wrappers 33 are fed successively and come to rest on top of the fingers 19, being fed across to the fingers 4, and supported by the fingers 19 and 4. The fingers 19 and fingers 4 are being moved by the respective slide carriages 18 and 3 toward each other so as to support properly the wrapper 33. A wrapper 33 is in proper position when it comes immediately under the face 103 of the plunger 82 of the upper slide 70. The slide carriages 3 and 18, and the upper slide head 70 and lower slide head 85 move along with the movement of the wrappers and the buckets 34 as they are moved successively into position. When a wrapper 33 is properly positioned, the plunger 82, and the plunger blades 83, move downwardly from the position shown in Fig. 2 to the position shown in Fig. 7, so that a wrapper 33 will become impinged between the face 103 of the plunger 82 and the upper clamp face 101 of the lower slide head 85. The plunger 82 continues its downward movement from the position shown in Fig. 7 to the position shown in Fig. 8 whereupon the wrapper 33 will be clamped and its free right and left ends will extend over the bucket wall 37 on one side and over the side of the shiftable wall 39. The plunger blades 83, cause the wrapper to be so positioned, and the plunger blades 83 at the right of the plunger, Fig. 8, will be between the shiftable wall 39 and the button 45 on the plate member 44. The downward movement of the plunger 82 will depress the plate 101, and the plunger blades will cause the wrapper to assume the position shown in Fig. 9. In this latter figure, the left plunger blade will have moved the wrapper over the wall 37 of the bucket 34, while the right hand plunger 83 will shift the right hand free edge of the wrapper between the rear side of the shiftable wall 39 and the plate member 44. In this latter position, a roller 47 on the bucket will move up the incline on the cam bar 48 and cause the shiftable wall 39 to shift accurately to the right, Fig. 10, and clamp the right hand free edge of the wrapper between the outer edge of the shiftable wall and the button 45 on the plate 44. The plunger 82 will then start its upward movement as shown in Fig. 10, while the wrapper is lined in a bucket 34. The wrapper will be maintained in the positions shown in Figs. 10 and 11 while the upper plunger 82 and the lower plunger head 85 are returning to their normal position shown in Fig. 12. The fingers 4 and 19 are returned to initial position to receive again another wrapper 33, and the operations are continued successively.

The entire slide mechanism 50 is returned to normal initial position, toward the left, and is then ready to repeat another cycle, toward the right, to again receive another wrapper on the fingers 4 and 19 and line a wrapper 33 in the next succeeding bucket 34.

The invention provides relatively simple mechanism which is properly correlated and synchronized with other operating parts and are movable horizontally along with the horizontal movement of the conveyor buckets 34. A sheet is fed in position and then is lined by a wrapper by the successive operations disclosed diagrammatically in Figs. 2 and 7-12, inclusive. After the bucket has been lined, the upper and the lower plunger heads 70 and 85 respectively return to their normal upper and lower positions and the slides 3 and 18 are moved to their initial position ready to commence the next cycle of operation. The mechanism of the invention is strong and durable in construction and may be incorporated in new mechanism or applied readily to existing machines as a separate unit. The wrappers properly line the buckets so as to receive the articles to be wrapped. The bucket construction is such that its shiftable wall not only impinges the wrapper but also provides space for loading easily the articles to be wrapped. Machines of the present invention are adapted to be arranged immediately adjacent the mechanism for feeding articles into the lined buckets and then have wrappers wrapped about the articles by consecutive wrapping operations in the manner disclosed in the aforesaid Malhiot application.

Changes may be made in the form, construction and arrangement of the parts without departing from the spirit of the invention, or sacrificing any of its advantages, and the right is hereby reserved to make all such changes as fall fairly within the scope of the following claims.

The invention is hereby claimed as follows:

1. Conveying mechanism comprising a movable endless conveyor made up of a plurality of hingedly connected buckets, means for feeding a wrapper to a predetermined position, and means movable with the conveyor for placing said wrapper in a movable bucket, said last named means comprising a pair of vertically spaced clamping members for holding and positioning the wrapper in a said bucket, and means to move said clamping members one with respect to the other to clamp a wrapper therebetween.

2. Conveying mechanism comprising a movable endless conveyor made up of a plurality of hingedly connected buckets, means for feeding a wrapper to a predetermined position, means movable with the conveyor for placing said wrapper in a movable bucket, said last named means comprising a pair of vertically spaced clamping members for holding and positioning the wrapper in a said bucket, and cam actuated means on the bucket to clamp a wrapper to said bucket, and means to move said clamping members one with respect to the other to clamp a wrapper therebetween.

3. Conveying mechanism comprising a movable endless conveyor made up of a plurality of hingedly connected buckets, means for feeding a wrapper to a predetermined position, means movable with the conveyor for placing said wrapper in a movable bucket, said last named means comprising a pair of vertically spaced clamping members for holding and positioning the wrapper in a said bucket, cam actuated means on the bucket to clamp a wrapper to said bucket, said clamping members having vertically slidable movement, and means to reciprocate said clamping members horizontally.

4. Conveying mechanism comprising a plurality of hingedly connected buckets forming an endless conveyor, means to drive the conveyor, oppositely disposed carriages movable toward and away from each other and adapted to support a wrapper to be arranged in said bucket when a bucket arrives at a predetermined position, a plunger head engageable with a wrapper to position a part of a wrapper in a said bucket, and a clamping member cooperable with said plunger to clamp a wrapper to said plunger.

5. Conveying mechanism comprising a plurality of hingedly connected buckets forming an endless conveyor, means to drive the conveyor, oppositely disposed carriages movable toward and away from each other and adapted to support a wrapper to be arranged in said bucket when a bucket arrives at a predetermined position, a plunger head engageable with a wrapper to position a part of a wrapper in a said bucket, a clamping member cooperable with said plunger to clamp a wrapper to said plunger and a plunger blade positioned on each side of the plunger head and spaced therefrom and movable therewith for positioning a said wrapper at the ends of a bucket and outside thereof.

6. Conveying mechanism comprising a plurality of hingedly connected buckets forming an endless conveyor, means to drive the conveyor, oppositely disposed carriages movable toward and away from each other and adapted to support a wrapper to be arranged in said bucket when a bucket arrives at a predetermined position, a plunger head engageable with a wrapper to position a part of a wrapper in a said bucket, a clamping member cooperable with said plunger to clamp a wrapper to said plunger, a plunger blade positioned on each side of the plunger head and spaced therefrom and movable therewith for positioning a said wrapper at the ends of a bucket and outside thereof, and means to operate said plunger and said clamp in timed relationship with respect to the movement of said conveyor.

7. Conveying mechanism comprising a plurality of hingedly connected buckets forming an endless conveyor, means to drive the conveyor, oppositely disposed carriages movable toward and away from each other and adapted to support a wrapper to be arranged in said bucket when a bucket arrives at a predetermined position, a plunger head engageable with a wrapper to position a part of a wrapper in a said bucket, a clamping member cooperable with said plunger to clamp a wrapper to said plunger, a plunger blade positioned on each side of the plunger head and spaced therefrom and movable therewith for positioning a said wrapper at the ends of a bucket and outside thereof, means to operate said plunger and said clamp in timed relationship with respect to the movement of said conveyor, and means to operate said plunger and said clamp in timed relationship with said carriages.

8. Conveying mechanism comprising a plurality of hingedly connected buckets forming an endless conveyor, means to drive the conveyor, oppositely disposed carriages movable toward and away from each other and adapted to support a wrapper to be arranged in said bucket when a bucket arrives at a predetermined position, a plunger head engageable with a wrapper to position a part of a wrapper in a said bucket, a clamping member cooperable with said plunger to clamp a wrapper to said plunger, a plunger blade positioned on each side of the plunger head and spaced therefrom and movable therewith for positioning a said wrapper at the ends of a bucket and outside thereof, and means to operate said plunger and said clamp in timed relationship with respect to the movement of said conveyor and with respect to the movement of said carriage.

9. Conveying mechanism comprising a plurality of hingedly connected buckets forming an endless conveyor, means to drive the conveyor, oppositely disposed carriages movable toward and away from each other and adapted to support a wrapper to be arranged in said bucket when a bucket arrives at a predetermined position, a plunger head engageable with a wrapper to position a part of a wrapper in a said bucket, a clamping member cooperable with said plunger to clamp a wrapper to said plunger, and means to reciprocate said carriages, said carriage and said clamp in timed relationship with said conveyor.

10. Conveying mechanism comprising a plurality of hingedly connected buckets forming an endless conveyor, means to drive the conveyor, oppositely disposed carriages movable toward and away from each other and adapted to support a wrapper to be arranged in said bucket when a bucket arrives at a predetermined position, a plunger head engageable with a wrapper to position a part of a wrapper in a said bucket, a clamping member cooperable with said plunger to clamp a wrapper to said plunger, a plunger blade positioned on each side of the plunger head and spaced therefrom and movable therewith for positioning a said wrapper at the ends of a bucket and outside thereof, means to operate said plunger and said clamp in timed relationship with respect to the movement of said conveyor and with respect to the movement of said carriage, and means to reciprocate said carriages, head, clamp and blades as a unit in timed relationship with the movement of said conveyor.

11. Conveying mechanism comprising a horizontal movable endless conveyor made up of a plurality of hingedly connected buckets, means to operate said conveyor, means for feeding wrappers to a predetermined position, horizontal slide carriage to position a said fed wrapper with respect to a bucket on the moving conveyor, vertical clamping means including an upper plunger and a lower clamp member for clamping a wrapper therebetween and holding the wrapper in a predetermined position with respect to said bucket, means to reciprocate said slide carriages toward and away from each other horizontally, means to reciprocate said plunger and clamp member toward and away from each other, and means to reciprocate said carriages and clamping means in timed relation with each other and in timed relation with the movement of said conveyor.

12. Conveying mechanism comprising a horizontal movable endless conveyor made up of a plurality of hingedly connected buckets, means to operate said conveyor, means for feeding wrappers to a predetermined position, horizontal slide carriages to position a said fed wrapper with respect to a bucket on the moving conveyor, vertical clamping means including an upper plunger and a lower clamp member for clamping a wrapper therebetween and holding the wrapper in a predetermined position with respect to said bucket, means to reciprocate said slide carriages toward and away from each other horizontally, means to reciprocate said plunger and clamp member toward and away from each other, means to reciprocate said carriages and clamping means in timed relation with each other and in timed relation with the movement of said conveyor, means on said bucket to clamp a wrapper to the bucket, said last named means including a shiftable wall on the bucket, and a member resiliently mounted on a bucket, roller means on the bucket to control the movement of the shiftable wall, and a cam adapted to be engaged by said roller means when said bucket is at a predetermined position.

13. Conveying means comprising an endless conveyor made up of a plurality of spaced apart buckets hingedly connected together at their adjacent ends, means to operate said conveyor to bring buckets successively to a predetermined position, said buckets each comprising a left hand wall and a spaced right hand wall, a member yieldably connected to one of said walls, a shiftable wall intermediate said walls, and means to shift said shiftable wall against said member for clamping a wrapper therebetween.

CLARENCE J. MALHIOT.
ELMER SRAMEK.

REFERENCES CITED

The following references are of record in the file of this patent:

UNITED STATES PATENTS

| Number | Name | Date |
|---|---|---|
| 1,689,756 | Swangren | Oct. 30, 1928 |
| 2,277,877 | Malhiot | Mar. 31, 1942 |